US010315091B1

(12) United States Patent
Scott

(10) Patent No.: US 10,315,091 B1
(45) Date of Patent: Jun. 11, 2019

(54) WEARABLE BATTING TEE SYSTEM AND USE THEREOF

(71) Applicant: Phillip Scott, Peru, IL (US)

(72) Inventor: Phillip Scott, Peru, IL (US)

( * ) Notice: Subject to any disclaimer, the term of this patent is extended or adjusted under 35 U.S.C. 154(b) by 0 days.

(21) Appl. No.: 15/897,882

(22) Filed: Feb. 15, 2018

Related U.S. Application Data

(60) Provisional application No. 62/460,059, filed on Feb. 16, 2017.

(51) Int. Cl.
*A63B 69/00* (2006.01)
*A63B 47/00* (2006.01)
*G09B 19/00* (2006.01)
*A63B 102/18* (2015.01)

(52) U.S. Cl.
CPC ........ *A63B 69/0075* (2013.01); *A63B 47/001* (2013.01); *A63B 69/0002* (2013.01); *G09B 19/0038* (2013.01); *A63B 2069/0008* (2013.01); *A63B 2102/18* (2015.10); *A63B 2102/182* (2015.10); *A63B 2209/00* (2013.01); *A63B 2209/10* (2013.01); *A63B 2225/09* (2013.01); *A63B 2225/093* (2013.01)

(58) Field of Classification Search
CPC .......... A63B 69/0002; A63B 2069/008; A63B 69/0075; A63B 69/0086; A63B 2069/0075
USPC ...... 473/417, 418, 458, 424, 425; 248/219.1
See application file for complete search history.

(56) References Cited

U.S. PATENT DOCUMENTS

| | | | | |
|---|---|---|---|---|
| 2,976,040 A * | 3/1961 | Bales | ................. | A63B 69/0079 473/429 |
| 4,744,537 A * | 5/1988 | Buckley | ............... | F16M 13/022 211/107 |
| 5,553,848 A * | 9/1996 | Amron | ............... | A63B 69/0002 473/416 |
| 5,665,005 A * | 9/1997 | Ritchie | .............. | A63B 69/3608 473/215 |
| 5,989,137 A * | 11/1999 | Krueger | ............ | A63B 69/0091 473/423 |
| 9,498,692 B2 * | 11/2016 | Bledsoe | ............ | A63B 69/0059 |
| 2012/0094786 A1* | 4/2012 | Spallina | ............ | A63B 69/0002 473/417 |
| 2012/0220395 A1* | 8/2012 | Lay | .................... | A63B 69/0075 473/451 |
| 2014/0323248 A1* | 10/2014 | Muller | ............... | A63B 69/0002 473/429 |
| 2014/0329622 A1* | 11/2014 | Marshall | ........... | A63B 69/0086 473/424 |

* cited by examiner

Primary Examiner — Mark S Graham

(57) ABSTRACT

A wearable baseball tee having a tee device for holding a ball at a position away from the body of the user. The wearable baseball tee is configured to be worn on the body of a user and allows the user to swing a bat at the ball held away from the body of the user. The process of using the wearable baseball tee is also described.

20 Claims, 5 Drawing Sheets

WEARABLE BATTING TEE SYSTEM AND USE THEREOF

CROSS-REFERENCE TO RELATED APPLICATIONS

This application claims priority to U.S. Provisional Application No. 62/460,059 filed on Feb. 16, 2017, the disclosure of which, including any materials incorporated by reference therein, are incorporated herein by reference in their entireties.

FIELD OF THE INVENTION

The invention relates to baseball and softball batting tee systems, and the uses thereof.

BACKGROUND OF THE INVENTION

Traditional batting tee systems comprise a base and an elongated body or shaft, with the base configured to hold the shaft upright. The shaft is generally affixed to the base at one end, with a ball receiving receptacle configured at the other end. A batter can use the traditional batting tee system by resting a ball (e.g., baseball or softball) on the ball receiving receptacle and swinging a bat at the ball. The tee system is one preferred method of teaching players on the appropriate swing mechanics, but still allows for good effects (e.g., hitting the ball far) with less than ideal batting form. In addition, the ball is stationary, providing limited simulation of real game situations.

SUMMARY OF THE INVENTION

A wearable batting tee system and processes of using the same is provided herein. In particular, provided herein are wearable batting tee systems and processes that facilitate forcing users to develop measured and consistent swinging motions while hitting a ball. In some instances, improper and/or extraneous motions by a batter can cause the ball to move too much, making it nearly impossible to hit. Further, in some instances, even with measured and proper swinging, the ball will often move, forcing the batter to track the ball. Such systems and processes more closely mimic real life hitting situations than do traditional tee systems.

In some embodiments, provided herein is a wearable tee system, wherein a tee device is affixed or otherwise secured to a wearer body, such as with a ball receiving device being configured at an end of the tee device (e.g., configured to be worn distal to the wearer body).

In certain embodiments, provided herein is a wearable batting tee system (100) comprising:
a tee device (101) comprising a rigid elongated body (102), and a ball receiving device (104), the elongated body (102) having a first end (106) and a second end (107), and the ball receiving device (104) being affixed to the elongated body (102) at or near a second end (107) of the elongated body (102), the ball receiving device (104) being configured to secure a ball (108) distal to the elongated body (102);
at least one strap or belt (109, 112) being configured to be secured around a wearer body (111); and
at least one line device (114, 118), the at least one line device (114, 118) comprising a length of line (115, 119), and being secured or configured to be secured to the strap or belt (109, 112) and being secured or configured to be secured to the tee device (101).

In specific embodiments, provided herein is a wearable batting tee system (100) comprising:
a tee device (101) comprising an elongated body (102), and a ball receiving device (104), the elongated body (102) having a first end (106) and a second end (107), and the ball receiving device (104) being affixed to the elongated body (102) at or near a second end (107) of the elongated body (102), the ball receiving device (104) being configured to secure a ball (108) distal to the elongated body (102);
a first strap or belt (109) being configured to be secured around a wearer body (111) at a first location;
a second strap or belt (112) being configured to be secured around a wearer body (111) at a second location;
a first line device (114), the first line device (114) comprising a first length of line (115), and being secured or configured to be secured to the first strap or belt (109) and being secured or configured to be secured to the tee device (101); and
a second line device (118), the second line device (118) comprising a second length of line (119) and being secured or configured to be secured to the second strap or belt (112) and being secured or configured to be secured to the tee device (101).

In more specific embodiments, provided herein is a wearable batting tee system (100) comprising:
a tee device (101) comprising a rigid elongated body (102), a ball receiving device (104), a first fastening device (105), and a second fastening device (124), the elongated body (102) having a first end (106) of the elongated body (102), and the ball receiving device (104) being affixed to the elongated body (102) at or near a second end (107) of the elongated body (102), the ball receiving device (104) being configured to secure a ball (108) distal to the elongated body (102);
a first strap or belt (109) comprising a third fastening device (110) and being configured to be secured around a wearer body (111) at a first location;
a second strap or belt (112) comprising a fourth fastening device (113) and being configured to be secured around a wearer body (111) at a second location;
a first line device (114), the first line device (114) comprising a first length of line (115), a fifth fastening device (116), and a sixth fastening device (117), the fifth fastening device (116) being configured to be coupled with the first fastening device (105) and sixth fastening device (117) configured to be coupled with the third fastening device (110); and
a second line device (118), the second line device (118) comprising a second length of line (119), a seventh fastening device (120), and an eighth fastening device (121), the seventh fastening device (120) being configured to be coupled with the second fastening device (124) and eighth fastening device (121) configured to be coupled with the fourth fastening device (113).

In some embodiments, a wearable tee system provided herein further comprises a third line device (125), wherein the tee device (101) further comprises an optional tenth fastening device (not shown), the first strap or belt (109) further comprises an eleventh fastening device (126), and the third line device (125) comprises a third length of line (126), a twelfth fastening device (127), and a thirteenth fastening device (128), the thirteenth fastening device (128) being configured to be coupled with the optional tenth fastening device (not shown) or the first fastening device (105), and the twelfth fastening device (127) being configured to be coupled with the eleventh fastening device (126).

In certain embodiments, a tee device provided herein comprises a base body (103), the elongated body (102) terminating in the base body (103) at the first end (106) of the elongated body (102). In specific embodiments, the base body (103) laterally extends from the elongated body (102) in at least one direction.

In certain embodiments, a system herein further comprises a third strap or belt (122), the third strap or belt (122) comprising a ninth fastening device (123) and being configured to be secured around a wearer body (111) at a third location, the ninth fastening device (123) configured to receive and/or secure the first end (106) of the tee device (101), or the base body thereof (103), to the third strap or belt (122).

Any suitable fastening device is optionally utilized herein. Moreover, in some embodiments, any one or more of the fastening devices is optionally removed, such as wherein a single fastener is used to replace the coupling of a pair of fasteners, or the fasteners are eliminated or combined to form or be replaced with an integrated connection. In some instance, each fastening device is independently, a hook (e.g., comprising metal, fabric, plastic, etc., including Velcro® hooks), a loop (e.g., comprising metal, fabric, plastic, etc., including Velcro® loops and spring links), or a buckle fastener (male or female).

In certain embodiments, a system or tee device provided herein further comprises a cushion configured at and/or around the end of the second end (107) of the elongated body (102) (e.g., extending inward from the second end (107) around at least a portion of the elongated body (102)).

Any suitable ball receiving device is optionally included, such that it is capable of securing a ball at or near the distal end of the tee (i.e., distal to the wearer). In specific embodiments, the ball receiving device comprises a suction cup, a flexible or elastic band (e.g., large rubber band), or a strap comprising fabric and/or plastic hook and loop fasteners (e.g., Velcro®).

Belts, straps, lines, shafts, bodies, and the like are comprised of any suitable material. In some instances, such components are independently flexible, inflexible, adjustable, non-adjustable, or the like. In specific embodiments, each strap or belt is independently flexible (e.g., comprises an elastic material) or non-flexible (e.g., comprises a non-elastic material). In some embodiments, the belt is a buckleless belt, such as being elastic to secure in place when placed around a wearer. In further or alternative embodiments, the belt is a buckled belt that can be adjusted and secured around a wearer. In certain embodiments, a strap provided herein is a part of a harness system. In specific embodiments, a first and second strap provided herein are a part of a single harness system comprising both the first and second straps. In further or alternative embodiments, one or more line device has an adjustable length. Similarly, in some embodiments, the tee device or elongated body thereof has an adjustable length and/or has a telescopic body. In certain embodiments, each component of a system herein is independently selected from any suitable material, such as by way of non-limiting example, natural materials (e.g., natural rope or leather), synthetic fabric, plastic, composite, metal (e.g., cable), or a combination thereof. In specific embodiments, each length of line independently and/or belt comprises natural materials (e.g., natural rope or leather), synthetic fabric, plastic, composite, metal (e.g., cable), or a combination thereof. In some embodiments, the elongated body comprises wood, plastic, composite, metal, rubber, or a combination thereof.

In certain specific embodiments, provided herein is a process for using a wearable batting tee, such as described herein. In some embodiments, the process comprises securing a wearable batting tee, such as described herein, to a wearer, and securing a baseball to the tee (e.g., in a ball receiving device at the distal end of the tee). In certain embodiments, the wearer then swings an object (e.g., baseball bat) at the ball (e.g., with the intent to hit the ball). In specific embodiments, a process provided herein comprises:
  providing a tee device (101) comprising an elongated body (102), a ball receiving
    device (104), a first fastening device (105), and a second fastening device (124), the elongated body (102) having a first end (106) and a second end (107), the ball receiving device (104) being affixed to the elongated body (102) at or near a second end (107), the ball receiving device (105) being configured to secure a ball (108) distal to the wearer body (111),
  securing a first strap or belt (109) around a wearer body (111) at a first location, the first strap or belt (109) comprising a third fastening device (110);
  securing a second strap or belt (112) around a wearer body (111) at a second location, the second strap or belt (112) comprising a fourth fastening device (113);
  securing a first line device (114) to the first strap or belt (109) and the tee device (101), the first line device (114) comprising a first length of line (115), a fifth fastening device (116), and a sixth fastening device (117) (in alternative embodiments, the first line device is optionally pre-secured to the first strap or belt and the tee device); and
  securing a second line device (118) to the second strap or belt (112) and the tee device (101), the second line device (118) comprising a second length of line (119), a seventh fastening device (120), and an eighth fastening device (121) (in alternative embodiments, the second line device is optionally pre-secured to the second strap or belt and the tee device).

In certain embodiments, the process further comprises securing the first line device (114) to the first strap or belt (109) and the tee device (101) by:
  coupling the fifth fastening device (116) with the first fastening device (105); and
  coupling the sixth fastening device (117) with the third fastening device (110).

In some embodiments, the process further comprises securing the second line device (118) to the second strap or belt (112) and the tee device (101) by:
  coupling the seventh fastening device (120) with the second fastening device (124); and
  coupling the eighth fastening device (121) with the fourth fastening device (113).

In certain embodiments, the first strap or belt is positioned between the hips and the chest of the wearer and the second strap or belt is positioned between the knees and the navel of the wearer. In some embodiments, the tee device (e.g., base end or base body thereof) is positioned between the first strap and the second strap. In addition, in some embodiments, a third belt or strap is secured to the wearer (e.g., between the first and second straps or belts), such as wherein the base end or base body of the tee device is secured to the third belt or strap.

BRIEF DESCRIPTION OF THE DRAWINGS

The foregoing features and other aspects of the invention are explained in the following description taken in conjunc

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Figure 1:
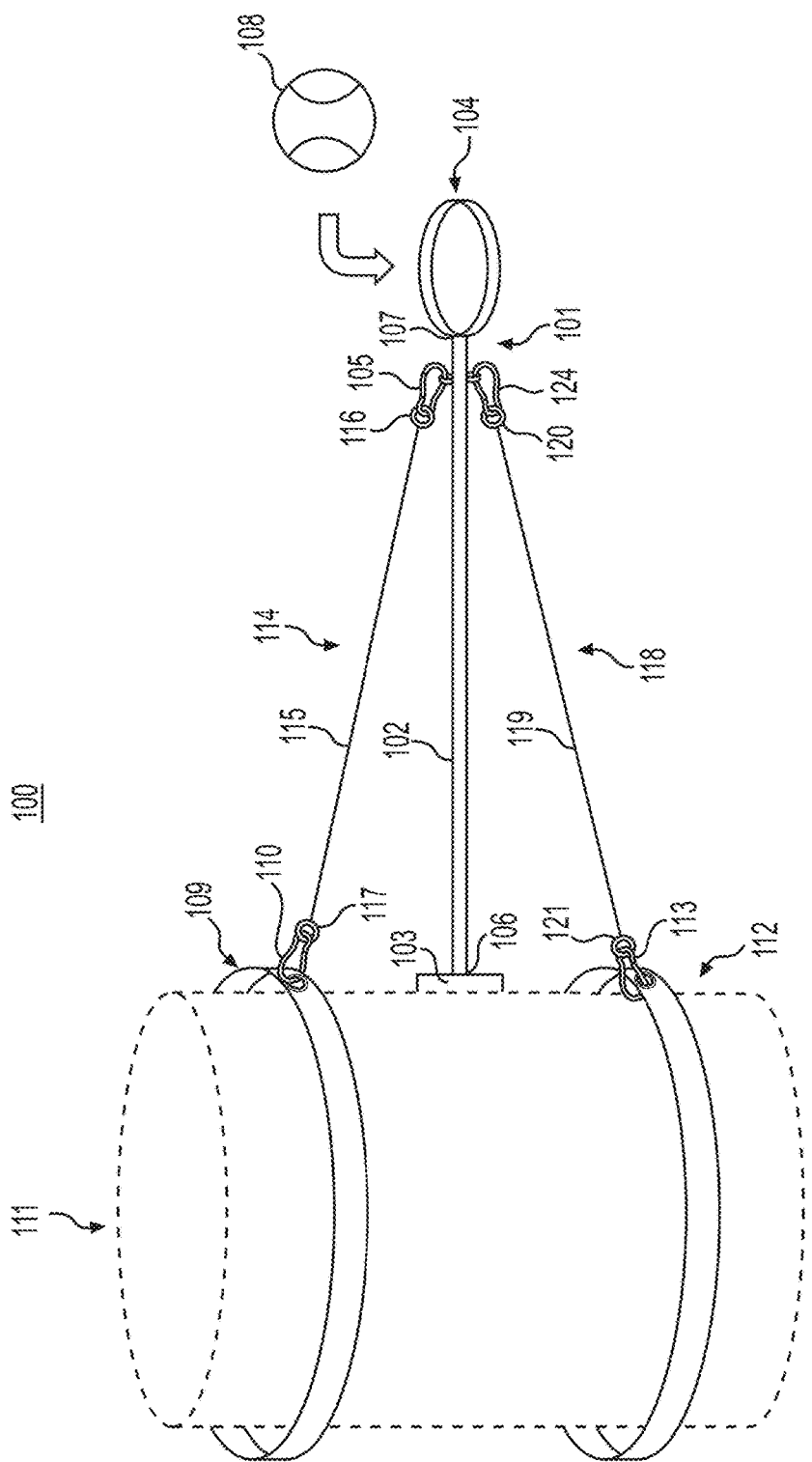
- FIG. 1 illustrates an exemplary schematic of one embodiment of a system provided herein.

Provided in general embodiments herein is a batting tee system, such as a wearable batting tee system, and methods of using the same. In certain embodiments, provided herein is a system comprising a batting tee system comprising a tee device that is capable of being affixed to an individual's (a "wearer's") body. In certain embodiments, the tee device comprises an elongated body (the tee "shaft") and a ball receiving device configured at or near one end thereof. Generally, the ball receiving device is configured to secure a ball (e.g., baseball or softball) at or near one end of the elongated body (e.g., distal to the wearer's body). In certain embodiments, one end of the tee devices is configured to be placed proximal to the wearer's body, whereas the ball receiving device is configured to be placed distal to the wearer's body. In certain embodiments, the wearable batting tee system comprises one or more belts (e.g., buckled or elastic straps configured to encircle a wearer's body) configured to facilitate securing the tee device to a wearer's body, particularly to secure one end of the tee device proximal to the wearer's body and a second end (e.g., the second end of the tee device comprising a ball receiving device affixed thereto) of the tee device distal to the wearer's body. In various embodiments, each strap or belt is independently positioned anywhere between the wearer's feet and head. In some embodiments, a first and second belt is utilized, wherein the first and second belts are configured at least 3 inches apart, at least 6 inches apart, at least 9 inches apart, at least 12 inches apart, or the like. In certain embodiments, when positioned below the waist, the strap or belt is optionally configured to be secured around one foot or leg, or both feet or legs. Similarly, positioning above the waist also contemplates securing the strap or belt around the torso or midriff and/or around an arm or arms, such as at the shoulder. In some embodiments, the system further comprises one or more lines or other devices attaching the tee device to the one or more belts. In certain embodiments, the components (e.g., belt(s), tee device, and/or line(s)) are secured or capable of being secured to one other, such as via one or more fastening device, by integrated construct, or a combination thereof. In some instances, wherein the components are sec FIG. 1 illustrates a non-limiting exemplary embodiment of a wearable batting tee system 100 provided herein, as well as a configuration as to how such a system is worn during use in a process herein. As illustrated, the wearable batting tee system 100 comprises a tee device 101. The tee device 101 comprises an elongated body 102, with a first end 106 and a second end 107, and a ball receiving device 104. The ball receiving device 104 is affixed to the elongated body 102 at or near the second end 107 (i.e., the end distal to the wearer body 111). The ball receiving device 104 being configured to secure a ball 108 (which may or may not be a part of a system herein) distal to the elongated body (102) of the tee device 101.

Also illustrated is an exemplary mechanism by which the tee device 101 is secured to the wearer body 111, with the first end 106 being configured proximal to the wearer body 111, and the second end 107 being configured distal to the wearer body 111. In some instances, the system 100 comprises one or more belt or strap, such as a first strap or belt 109 being secured or configured to be secured around a wearer body 111 at a first location. The first location can be any location on the wearer body, such as between the feet and the head, but preferably between the hips and the chest (e.g., including up to just under the armpits). In some instances, a second strap or belt 109 is also included, such a being configured to be secured around the wearer body 111 at a second location. As with the first strap or belt, the second strap or belt can be configured at any suitable location, but is generally configured at a position below the first strap or belt and/or below the first end of the tee device. Preferably, the first strap or belt is configured above the (e.g., first end of the) tee device and the second strap or belt is configured below the (e.g., first end of the) tee device. In certain instances, such a configuration limits mobility of the tee device during and after swinging a bat at the ball secured therein (e.g., allowing the ball to be hittable and allowing the tee to be ready for the next use).

In some embodiments, the belts are secured to the tee device by one or more line, such as to secure the tee device (e.g., first end thereof) to or in proximity to the wearer body. Preferably, at least three lines are used, with at least two lines securing the tee device to one or other of the first or second strap or belt and at least one line securing the tee device to the other of the first or second strap or belt. In certain embodiments, each line is secured to the tee device at any suitable location, preferably between the midpoint of the tee device and the second (distal) end of the device. An exemplary configuration is illustrated in FIG. 1, where the system comprises a first line device 114, the first line device 114 comprising a first length of line 115, and being secured or configured to be secured to the first strap or belt 109 and being secured or configured to be secured to the tee device 101. Also illustrated is a second line device 118, the second line device 118 comprising a second length of line 119 and being secured or configured to be secured to the second strap or belt 112 and being secured or configured to be secured to the tee device 101. As discussed herein, the line is optionally secured to the tee device and/or the belt device in any suitable manner, such as via an integrated connection, or via the coupling of a pair of fastening device. In some instances, wherein fastening devices are used, the fastening devices are optional pre-secured, or secured by a wearer/user prior to use.

In certain embodiments, systems provided herein comprises one or more fastening device or pair thereof, such as configured to secure a line device herein to a tee device or a strap device. FIG. 1 illustrates exemplary fastening configurations of systems herein whereby the components of the system are secured to one another. For example, in some instances, the tee device comprises one or more fastening device, such as a first fastening device 105, and a second fastening device 124. In certain instances, a first strap or belt 109 comprises a third fastening device 110 and/or a second strap or belt 112 comprises a fourth fastening device 113. In some instances, the first line device 114 comprises a first length of line 115, a fifth fastening device 116, and a sixth fastening device 117. In specific instances, the fifth fastening device 116 is coupled with or configured to be coupled with the first fastening device 105 and sixth fastening device 117 is coupled with or configured to be coupled with the third fastening device 110. In certain instances, the second line device 118 comprises a second length of line 119, a seventh fastening device 120, and an eighth fastening device 121. In specific instances, the seventh fastening device 120 is coupled with or configured to be coupled with the second fastening device 124 and eighth fastening device 121 is coupled with or configured to be coupled with the fourth fastening device 113.

Figure 2:
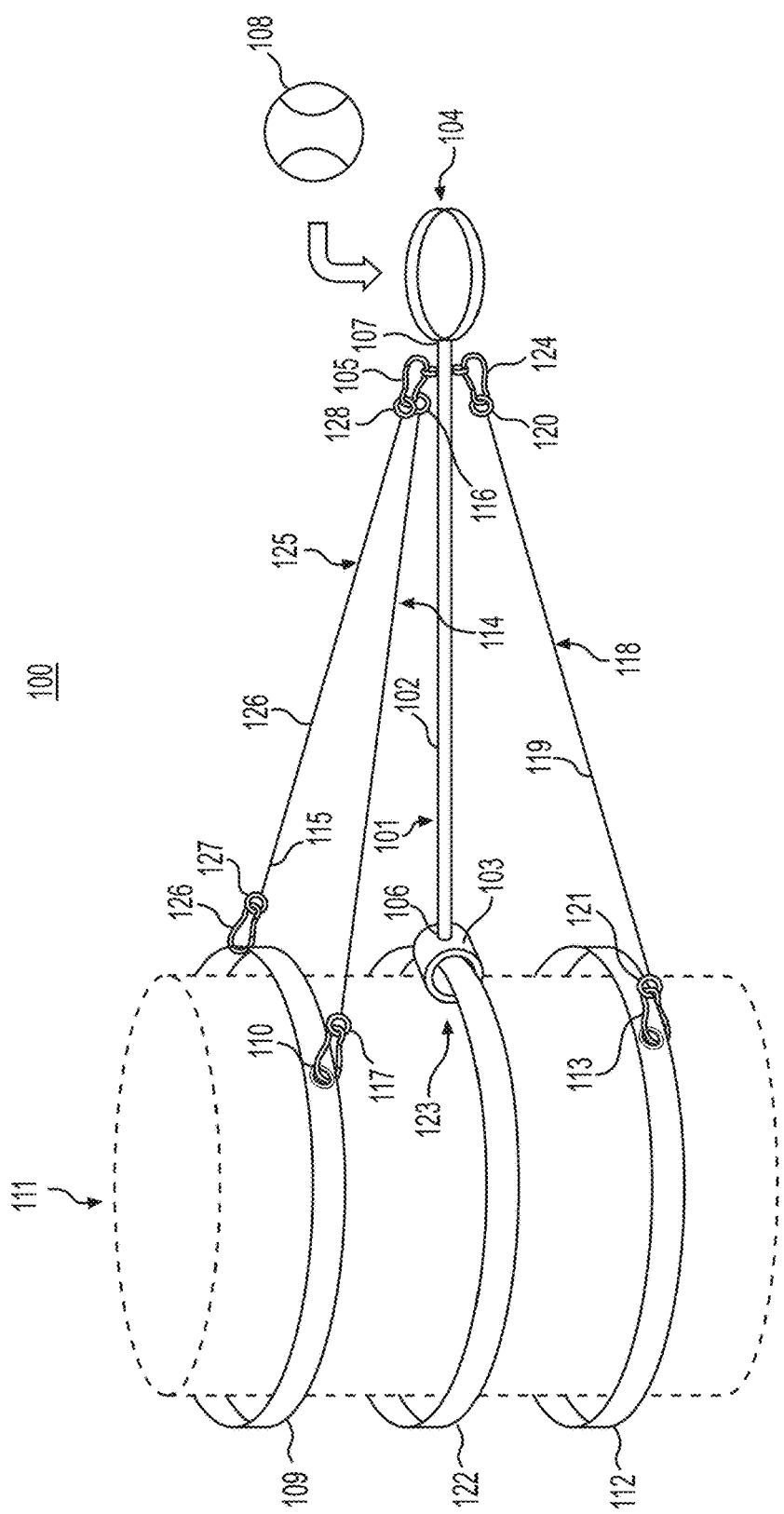
FIG. 2 illustrates an exemplary schematic of one embodiment of a system provided herein.

In addition to the features illustrated by the exemplary embodiment described in FIG. 1, FIG. 2 illustrates a number of additional features included in various embodiments herein. For example, FIG. 2 illustrates a wearable tee system 100 comprising a third line 125, configured to fasten a belt or strap of the system to the tee device 101. As specifically illustrated, in some embodiments, the tee device 101 comprises an optional tenth fastening device (not shown), the first strap or belt 109 comprises an eleventh fastening device 126, and the third line device 125 comprises a third length of line 126, a twelfth fastening device 127, and a thirteenth fastening device 128, the thirteenth fastening device 128 being configured to be coupled with the optional tenth fastening device (not shown) or the first fastening device 105, and the twelfth fastening device 127 being configured to be coupled with the eleventh fastening device 126.

In some embodiments, as illustrated in both FIG. 1 and FIG. 2, the tee device 101 comprises a base body 103 configured at the base end 106 of the elongated body 102 of the tee device 101. In some instances, the base body 103 laterally extends from the elongated body 102 in at least one direction. In various embodiments, the base body extends in a single direction (e.g., forming an "L" with the elongated body) or more than one direction (e.g., forming a "T" with the elongated body). In certain embodiments, the base body is flat, spherical, or any other suitable shape (e.g., such as to be received into a base body receiving device of the system herein).

In certain embodiments, an additional strap or belt is utilized, such as to secure a base (proximal) end or base body of the tee device to or in proximity to the wearer body (e.g., between the knees and chest). In specific embodiments, the additional strap or belt comprises a fastening device (e.g., a fabric slot configured to receive the base body, a strap (e.g., Velcro® strap) configured to wrap around and secure the base body or base end, or the like. In specific embodiments, such as illustrated in FIG. 2, the system comprises a third strap or belt 122, the third strap or belt 122 comprising a ninth fastening device 123 and being configured to be secured around a wearer body 111 at a third location, the ninth fastening device 123 configured to receive and/or secure the first end 106 of the tee device 101, or the base body thereof 103, to the third strap or belt 122.

In certain embodiments, further provided herein is a cushion configured at and/or around the end of the second (distal) end of the elongated body (e.g., extending inward from the second end around at least a portion of the elongated body). In certain instances, the cushion comprises a soft material, such as foam or rubber. In some instances, the cushioned body protects the tee device from damage when and if struck (e.g., inadvertently) by a bat and/or reduces the jarring impact to a user when (e.g., inadvertently) striking the tee with a bat.

In the systems provided herein, the various straps, belts, fasteners, bodies, lines, and the like comprise any suitable material, such as natural, synthetic, metal, composite, or the like materials.

In certain embodiments, any one or more fastening device described herein is optionally eliminated, such as to integrate the connected pieces together, rather than requiring the coupling of various fastening devices to connect such pieces. In addition, in some embodiments, one or more fastening device is optionally eliminated, such as wherein a single fastening device is configured to secure one body herein (e.g., a line) to another body (e.g., a tee device or a strap or belt). For example, in FIG. 1, first belt 109 fastening device 110 is optionally eliminated when fastening device 117 of first line device 114 is suitable for affixing line device 117 to the first belt 109 without the need for the coupling to a fastening device 110 of the first belt or strap 109.

Figure 3:
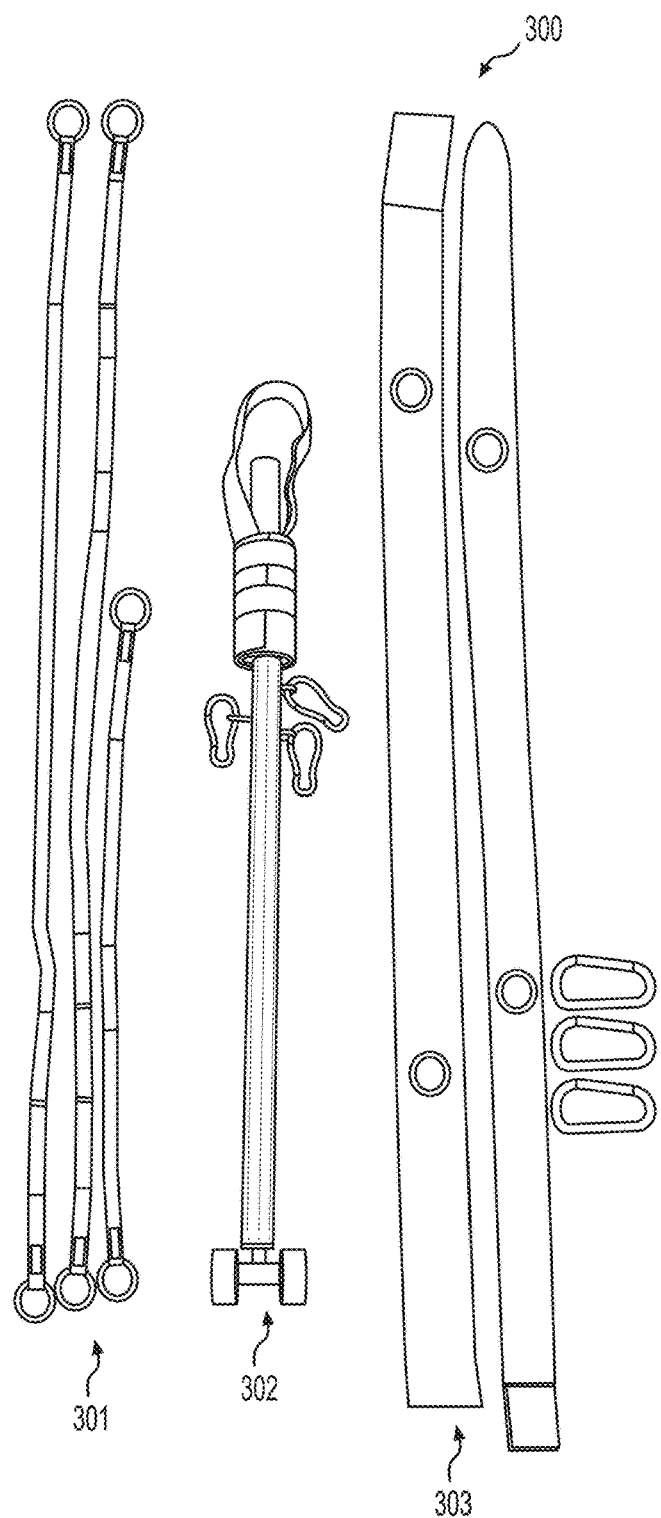
FIG. 3 illustrates exemplary embodiments of various components of the systems provided herein.
Figure 4:
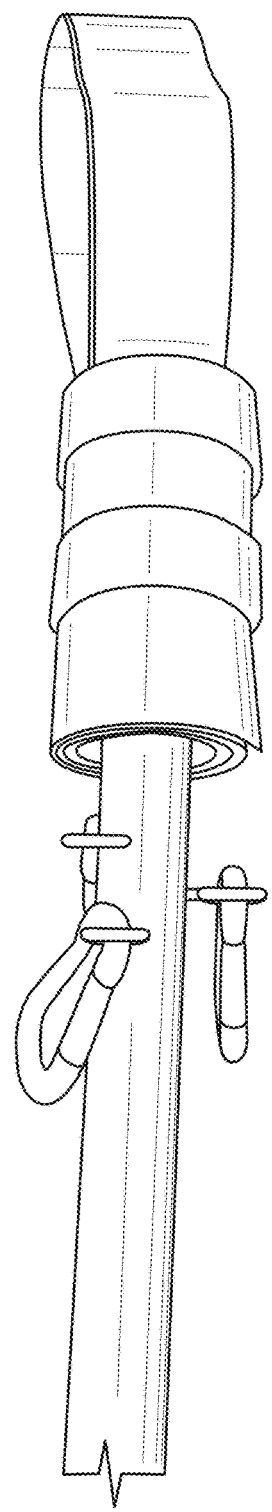
FIG. 4 illustrates an exemplary embodiment of the distal end of a tee device provided herein.

FIG. 3 illustrates a non-limiting exemplary unassembled system 300 described herein. Illustrated are exemplary line devices 301 comprising a fastening device at one end (a ring) and a fastening device at the other end (Velcro® segment, forming a loop when affixed). A tee device 302 is also illustrated, comprising a base body at one end and a ball receiving device (an elastic strap affixed to the elongated body) at the other end. As illustrated, the fastening devices (spring links) configured to couple with the fastening devices of the line devices are configured between the mid-point of the elongated body and the distal end of the tee device (only one fastening device is affixed to the tee device in the illustrate, but FIG. 4 illustrates an embodiment wherein three fastening devices are affixed to the tee device). In addition, the tee device comprises a cushion at the end thereof (e.g., in this instance wherein the ball is secured between the end of the cushioned body and the elastic strap of the ball receiving device). Finally, a first and second belt or strap is included, with fasteners (not attached with the belts in the figure) (spring links) configured to be able to secure the line devices to the belts.

Figure 5:
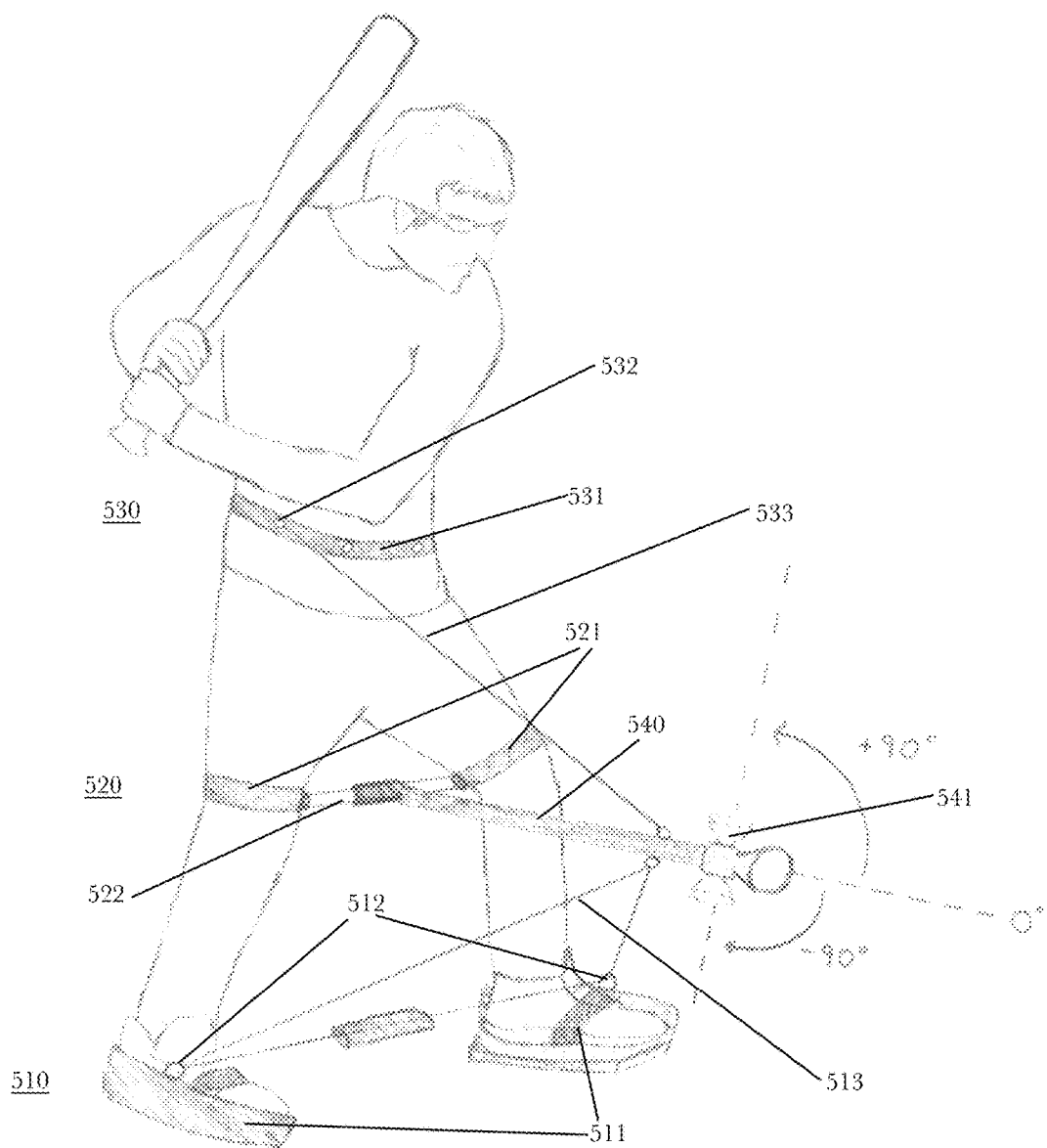
FIG. 5 illustrates and exemplary schematic of one embodiment of the system in use.

FIG. 5 illustrates a non-limiting example of the system in use by a batter. In this example, a three-tier system is shown. In a primary tier 510, foot housings 511 are shown. At an upper portion of foot housing 511 is a fastener 512, shown in this example as a ring. In a secondary tier 520, two independent belts or loops 521 are designed to be looped around a user's legs. Connecting two independent belts or loops 521 is a connecting portion 522. Connecting potion 522 can be elastic or otherwise extendible to allow for various widths in user stances. In tertiary tier 530, belt 531 is provided and designed to fit around a user's waist. Belt 531 has at least one ring 532, but preferably at least three rings to which one end of strap 533 can attach.

Connected to connecting portion 522 is tee device 540. Tee device 540 has first and second ends. The first end of tee device 540 is connected to connecting portion 522 and the second end of tee device 540 has a tee or ball receiving device 541, capable of holding a ball. Opposing end of strap 533 is attached to tee device 540. Foot housings 511 are also independently connected to tee device 540 via straps 513.

Tee device 540 can be extendable, for example, in a telescoping manner. In a telescoping embodiment, the extendible tee may have one or more of an inner, outer and middle tubes or poles. The tubes or poles may have various fasteners which allow the tubes and poles to be fixed at various lengths. In an exemplary embodiment the extendible tee device can extend between the lengths of 30" and 45".

In specific instances, each fastening device is independently, a hook (e.g., comprising metal, fabric, plastic, etc., including Velcro® hooks), a loop (e.g., comprising metal, fabric, plastic, etc., including Velcro® loops and spring links), a buckle fastener (male or female), or other suitable device. Fastening devices are optionally made of any suitable material, such as metal, fabric, plastic, rubber, wood, rope, cord, or any other suitable material, or combinations thereof.

In various instances, the ball receiving device is any suitable device. For example, in some embodiments, the ball receiving device comprises a suction cup, a flexible or elastic band (e.g., large rubber band), or a strap comprising fabric and/or plastic hook and loop fasteners (e.g., Velcro®). In alternative embodiments, the ball receiving device is a magnet, or a metal capable of being magnetized (e.g., wherein used in combination with a ball comprising a metal capable of being magnetized or a magnet, respectively). The length of the ball receiving device, such as extending beyond the elongated tee body, is any suitable length to accommodate a desired ball, such as a baseball or softball. In some instance, depending on the type of ball receiving device, the length of the ball receiving device has a length of and/or extends beyond the elongated tee body by up to about 12 inches (e.g., about 2 inches to about 10 inches, about 4 inches to about 10 inches, about 6 inches to about 10 inches, about 2 inches to about 6 inches, or the like).

A tee device provided or elongated body herein comprises any suitable material. In certain embodiments, the tee device or elongated body comprises wood, plastic, composite, metal, rubber, or a combination thereof. In some embodiments, the tee device is adjustable, such as adjustable in length. In specific embodiments, the tee device or elongated body thereof is telescopic. In certain embodiments, the elongated body has a length of about 12 inches to about 30 inches, such as about 14 inches to about 24 inches. In some instances, any suitable length is optionally utilized, such as to accommodate usage by individuals of varying heights. In some instance, a telescopic body has a shortest length of about 12 inches and a longest length of about 30 inches.

A belt or strap provided herein is of any suitable size, configuration, or material. In specific embodiments, each strap or belt is independently flexible (e.g., comprises an elastic material) or non-flexible (e.g., comprises a non-elastic material). In certain embodiments, the strap or belt is secured around the body of a user by using hook and loop fabric (e.g., Velcro), a buckle, or any other suitable mechanism. In other embodiments, a continuous elastic belt or strap is utilized (e.g., and is secured in place when the user pulls the belt or strap over his feet and up his legs until in position). In certain embodiments, the belt can be adjustable for size.

A line device provided herein comprises any suitable line material and any suitable fastening devices, such as described herein. In certain embodiments, the length of the line device is adjustable (e.g., by adjusting the size of a Velcro loop at the end of the line, or by a strap length adjuster buckle, or the like). In some embodiments, each length of line independently comprises natural materials (e.g., natural rope or leather), synthetic fabric, plastic, composite, metal (e.g., cable), or a combination thereof.

Provided in certain embodiments herein are processes of using a wearable batting tee, such as described herein. In some embodiments, the process comprises securing a batting tee device to the body of a user, securing a ball within a ball receiving device of a batting tee device, and swinging a bat at the ball. The batting tee device is secured to the wearer in any suitable manner, such as using a system described herein.

In some embodiments, a process of using a wearable batting tee comprises providing a tee device (101) comprising an elongated body and a ball receiving device. In some embodiments, the elongated body has a first end and a second end. In specific embodiments, the ball receiving device is affixed to the elongated body at or near a second end. In further or alternative embodiments, the ball receiving device is configured to secure a ball distal to the wearer body. In certain embodiments, a process provided herein comprises securing a first strap or belt around a wearer body at a first location. In specific embodiments, the first strap or belt comprises a third fastening device. In some embodiments, a process provided herein comprises securing a second strap or belt around a wearer body at a second location. In specific embodiments, the second strap or belt comprises a fourth fastening device. In certain embodiments, a first line device is secured to the first strap or belt. In other embodiments, the process comprises securing the first line device to the first strap or belt. Similarly, in some embodiments, the first line device is secured to the tee device. In other embodiments, the process comprises securing the first line device to the tee device. In specific embodiments, the first line device comprises a first length of line. In more specific embodiments, the first line device comprises a fifth fastening device and a sixth fastening device. In alternative embodiments, the first line device is optionally secured to the tee device and/or the first belt or strap by any integrated connector (e.g., the fastening devices are eliminated). In some embodiments, a second line device is secured to the second strap or belt. In other embodiments, the process comprises securing the second line device to the second strap or belt. Similarly, in some embodiments, the second line device is secured to the tee device. In other embodiments, the process comprises securing the second line device to the tee device. In specific embodiments, the second line device comprises a second length of line. In more specific embodiments, the first line device comprises a seventh fastening device and an eighth fastening device. In alternative embodiments, the second line device is optionally secured to the tee device and/or the second belt or strap by any integrated connector (e.g., the fastening devices are eliminated).

In some embodiments, a process herein comprises securing the first line device to the first strap or belt and the tee device by coupling the fifth fastening device with the first fastening device; and coupling the sixth fastening device with the third fastening device.

In certain embodiments, a process herein comprises securing the second line device to the second strap or belt and the tee device by coupling the seventh fastening device with the second fastening device; and coupling the eighth fastening device with the fourth fastening device.

In certain embodiments, the first strap or belt is positioned between the knees and the head of the wearer, such as between the hips and the chest of the wearer. In some embodiments, the second strap or belt is positioned between the feet and the navel, such as between the knees and the navel or between the feet and the thighs of the wearer. In preferred embodiments, the first and second strap are positioned at least 6 inches apart (e.g., in the front of the wearer, such as on a vertical axis running through the navel of the wearer), such as at least 9 inches apart, or at least 12 inches apart. In some embodiments, the tee device (e.g., base end thereof) is positioned between the first and second straps or belts.

In some embodiments, a third line device is secured to the tee device and either the first or second belt. In certain embodiments, further line devices are also optionally secured. The line devices are optionally secured as a part of a process herein, pre-secured, or integrated with the belt and/or tee device. Appropriate coupling of fasteners, such as described herein, is contemplated, in some embodiments, as a part of a process herein when such lines are present.

In certain embodiments, the process herein further comprises securing a third belt or strap around the wearer. In specific embodiments, the third belt comprises a fastening device configured to secure the base (proximal) end of the tee device, or a base body thereof, to the third belt or strap. In certain embodiments, the process further comprises securing the tee device, such as the base end or base body thereof, to the third belt, such as the fastening device thereof.

In some embodiments, a process herein comprises securing or otherwise configuring a ball at least partially within the ball receiving device. In further embodiments, the process comprises swinging an object, such as a baseball or softball bat, toward the ball (and, optimally, hitting the ball with the object).

What is claimed is:

1. A wearable batting tee system comprising:
    a tee device comprising an elongated body, a ball receiving device, a first fastening device, and a second fastening device,
        the elongated body having a first end of the elongated body, and the ball receiving device being affixed to the elongated body at or near a second end of the elongated body, the ball receiving device being configured to secure a ball distal to the elongated body;
    a first strap or belt comprising a third fastening device and being configured to be secured around a wearer body at a first location;
    a second strap or belt comprising a fourth fastening device and being configured to be secured around a wearer body at a second location;
    a first line device the first line device comprising a first length of line, a fifth fastening device, and a sixth fastening device, the fifth fastening device being configured to be coupled with the first fastening device and sixth fastening device configured to be coupled with the third fastening device; and
    a second line device, the second line device comprising a second length of line, a seventh fastening device, and an eighth fastening device, the seventh fastening device being configured to be coupled with the second fastening device and eighth fastening device configured to be coupled with the fourth fastening device.

2. The wearable tee system of claim 1, further comprising a third line device, wherein the tee device further comprises a tenth fastening device, the first strap or belt further comprises an eleventh fastening device, and the third line device comprises a third length of line, a twelfth fastening device, and a thirteenth fastening device, the thirteenth fastening device being configured to be coupled with the tenth fastening device or the first fastening device, and the twelfth fastening device being configured to be coupled with the eleventh fastening device.

3. The wearable batting tee system of claim 1, wherein tee device further comprises a base body, the elongated body terminating in the base body at the first end of the elongated body, the base body laterally extending from the elongated body in at least one direction.

4. The wearable batting tee system of claim 1, further comprising a third strap or belt, the third strap or belt comprising a ninth fastening device and being configured to be secured around a wearer body at a third location, the ninth fastening device configured to receive and/or secure the first end of the tee device, or the base body thereof, to the third strap or belt.

5. The wearable tee system of claim 1, wherein each fastening device is independently, a hook, a loop, or a buckle fastener.

6. The wearable tee system of claim 1, wherein one or more of the paired fastening devices are integrated.

7. The wearable tee system of claim 1, further comprising a cushion configured around the end of the second end of the elongated body.

8. The wearable tee system of claim 1, wherein the ball receiving device comprises a suction cup, a flexible or elastic band, or a strap comprising fabric and/or plastic hook and loop fasteners.

9. The wearable tee system of claim 1, wherein each strap or belt is independently flexible or non-flexible.

10. The wearable tee system of claim 1, wherein one or more line device has an adjustable length.

11. The wearable tee system of claim 1, wherein each length of line independently comprises natural materials, synthetic fabric, plastic, composite, metal, or a combination thereof.

12. The wearable tee system of claim 1, wherein the elongated body comprises wood, plastic, composite, metal, rubber, or a combination thereof.

13. The wearable tee system of claim 1, wherein the elongated body of the tee device has an adjustable length.

14. A process for using a wearable batting tee, the process comprising:
    providing a tee device comprising an elongated body, a ball receiving device, a first fastening device, and a second fastening device,
        the elongated body having a first end and a second end, the ball receiving device being affixed to the elongated body at or near a second end, the ball receiving device being configured to secure a ball distal to the wearer body,
    securing a first strap or belt around a wearer body at a first location, the first strap or belt comprising a third fastening device;
    securing a second strap or belt around a wearer body at a second location, the second strap or belt comprising a fourth fastening device;
    securing a first line device to the first strap or belt and the tee device, the first line device comprising a first length of line, a fifth fastening device, and a sixth fastening device; and
    securing a second line device to the second strap or belt and the tee device, the second line device comprising a second length of line, a seventh fastening device, and an eighth fastening device.

15. The process of claim 14, wherein securing the first line device to the first strap or belt and the tee device comprises:

coupling the fifth fastening device with the first fastening device; and coupling the sixth fastening device with the third fastening device.

16. The process of claim 15, wherein securing the second line device to the second strap or belt and the tee device comprises:

coupling the seventh fastening device with the second fastening device; and coupling the eighth fastening device with the fourth fastening device.

17. The process of claim 14, further comprising configuring a ball at least partially within the ball receiving device.

18. The process of claim 14, further comprising swinging a baseball bat at the ball configured within the ball receiving device.

19. The process of claim 14, wherein the first strap or belt is positioned between the hips and the chest of the wearer and the second strap or belt is positioned between the knees and the navel of the wearer.

20. A wearable batting tee system comprising:

a tee device comprising a rigid elongated body having a first end and a second end;

a ball receiving device, the ball receiving device being affixed to the rigid elongated body at or near said second end of the elongated body, the ball receiving device being configured to secure a ball distal to the elongated body;

a first strap or belt being configured to be secured around a wearer body at a first location;

a second strap or belt being configured to be secured around a wearer body at a second location;

a first line device the first line device comprising a first length of line, and being secured or configured to be secured to the first strap or belt and being secured or configured to be secured to the tee device; and a second line device, the second line device comprising a second length of line and being secured or configured to be secured to the second strap or belt and being secured or configured to be secured to the tee device.

* * * * *